March 4, 1941.      S. W. SEELEY      2,233,751
FREQUENCY VARIATION INDICATOR CIRCUIT
Original Filed Oct. 17, 1935
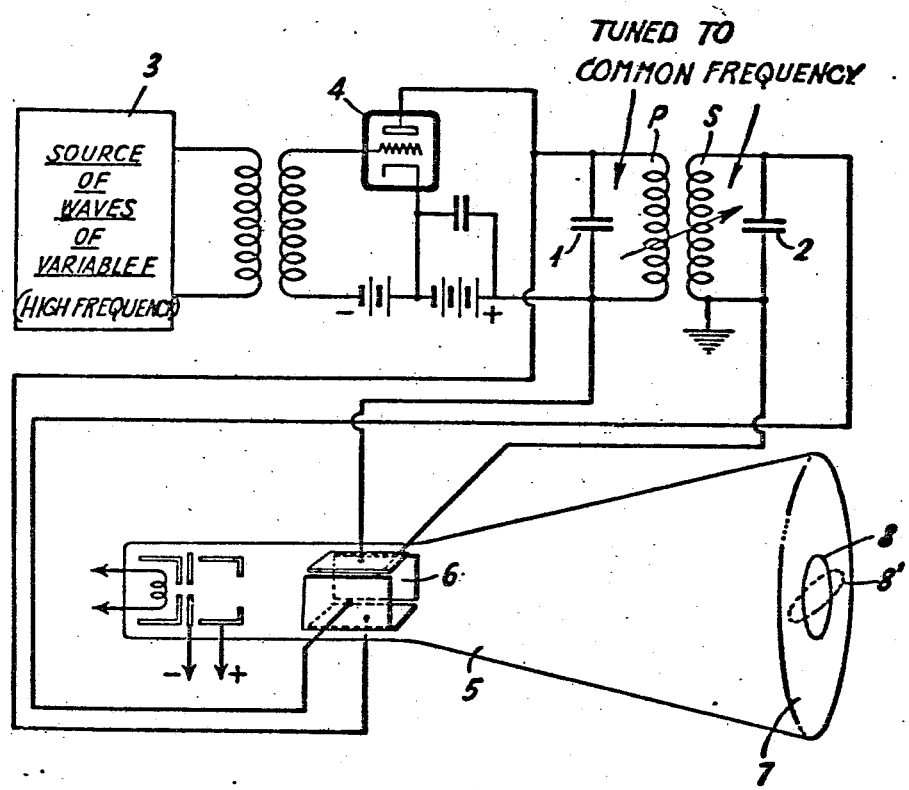
INVENTOR
STUART W. SEELEY
BY
ATTORNEY Patented Mar. 4, 1941

2,233,751

UNITED STATES PATENT OFFICE 2,233,751

FREQUENCY VARIATION INDICATOR CIRCUIT

Stuart W. Seeley, Bayside, Long Island, N. Y., assignor to Radio Corporation of America, New York, N. Y., a corporation of Delaware Original application October 17, 1935, Serial No. 45,413. Divided and this application January 14, 1938, Serial No. 184,926

2 Claims. (Cl. 172—245)

My present invention relates to high frequency variation response circuits, and more particularly to frequency response networks of a type utilizing changes in phase relations of primary and secondary circuit voltages which occur in coupled tuned circuits when the applied high frequency energy departs from resonance with the tuned circuits. The present application is a division of my copending application Serial No. 45,413, filed Oct. 17, 1935.

In the past frequency variation response circuits have been proposed for many uses. Such uses have involved the indication of frequency departure from a predetermined frequency value; the maintenance of a resonant circuit at a frequency of a predetermined magnitude; or the utilization of signal energy in a receiver for automatically tuning a resonant circuit to a predetermined frequency. Such proposed circuits have usually employed frequency discriminator networks embodying resonant circuits mistuned by equal frequency values to opposite sides of a predetermined operating frequency. The direct current component of the rectified output of a discriminator network is utilized, in such prior proposed circuits, to perform the functions referred to above. One of the chief disadvantages of such prior discriminator networks has been the difficulty in aligning the mistuned circuits of the discriminator with the resonant circuits of the receiving system which are tuned to the operating frequency.

Accordingly, it may be stated that it is one of the primary objects of my present invention to provide a high frequency variation response network wherein there is not employed side circuits tuned above and below a predetermined center frequency, but wherein the frequency discriminating circuits are tuned to the common operating frequency of the entire system with the result that the aligning of such a discriminator network with other circuits of the receiving system is greatly simplified, and signaling systems embodying such discriminator networks are rendered highly practical.

The aforementioned proposals of the prior art have all substantially utilized mistuned circuits in the discriminator network in such a manner that the differential direct current output of the mistuned circuits was obtained by virtue of alternate operation of rectifiers coupled to the mistuned circuits. That is to say in such prior circuits each mistuned circuit of the discriminator network is connected to a rectifier, and as the applied frequency departs from resonance with the desired operating frequency, the center frequency of the mistuned circuits, either one or the other of the mistuned rectifiers becomes operative to derive a direct current from the applied signal energy.

It is, then, one of the important objects of my present invention to provide a frequency variation response network which functions in an entirely different manner from such prior proposed circuits, and wherein there is established in the frequency response network a predetermined phase difference between a primary and secondary potential of a tuned network embodying primary and secondary circuits, the phase angle between the primary and secondary potentials varying as the applied energy varies in frequency from resonance.

Another important object of the present invention is to provide a method of, and apparatus for, obtaining differential direct current potentials, or currents, whose magnitude and polarity are determined by the amount and the sign, respectively, of the difference between an applied frequency and a certain fictitious frequency, and wherein the action depends upon the fact that a 90° phase difference exists between the primary and secondary potentials of a double tuned transformer when energy of the resonant frequency is applied, and that this phase angle varies as the applied frequency varies.

Still other objects of the invention are to improve generally the simplicity and efficiency of high frequency variation response networks, and more especially to provide such networks in a simple and economical manner which will not only be reliable in operation, but also be readily manufactured and assembled in desired signaling systems.

The novel features which I believe to be characteristic of my invention are set forth in particularity in the appended claims; the invention itself, however, as to both its organization and method of operation will best be understood by reference to the following description taken in connection with the drawing in which I have indicated diagrammatically a circuit organization whereby my invention may be carried into effect.

As stated heretofore, the functioning of the present invention depends upon a predetermined phase relationship which exists between the potentials of coupled tuned circuits. In particular, the action depends upon the fact that when a pair of resonant circuits are coupled, and each circuit is tuned to the same operating frequency, then a 90° phase difference exists between the potentials across the coupled circuits. As a result the phase angle between these potentials varies as the frequency of the energy applied to the coupled circuits departs from resonance therewith.

The single figure of the drawing shows the present invention applied to a visual tuning indicator.

In the drawing, there is shown a pair of coupled resonant circuits P and S; the circuit P is tuned to a desired frequency by shunt condenser 1, while circuit S is tuned to the same frequency by condenser 2. The high frequency waves, which are to be applied to the double tuned network P—S, are derived from a source 3 of high frequency waves; and the source may be, for example, a signal generator capable of generating waves having a frequency of about 465 kc. Such a source includes a device enabling it to be adjusted in frequency so that the frequency of the waves can be varied, and those skilled in the art are fully aware of such devices. An amplifier 4 is used to amplify the waves from source 3 prior to their application to circuit P. The numeral 5 designates an oscilloscope of a well known type; the deflector plates being denoted by numeral 6, and the fluorescent screen thereof bearing numeral 7.

To visually depict the relations between the voltages across the primary and secondary circuits P and S off and on resonance with the impressed waves from source 3, a pair of the plates 6 are connected across circuit P, while the other pair of plates 6 are connected across circuit S. Assume, now, that each of circuits P and S is tuned to a predetermined frequency of source 3, say 465 kc., and waves of that frequency are impressed on amplifier 4 by source 3. A circular pattern 8 will form on the screen 7. This circle was observed to increase, or decrease, in diameter as the amplitude of the waves from source 3 increased, or decreased, respectively. Again, as the frequency of the waves generated by source 3 varied, the shape of pattern 8 was observed to change. The dotted ellipse 8' denotes the appearance of the pattern shape when the frequency of the impressed waves is varied. The degree of coupling between P and S determines whether or not the major axis of the ellipse will exceed the diameter of circle 8. Thus, if the coupling is adjusted to critical value, or over, the major axis will be greater as the applied frequency departs from resonance.

It will, therefore, be seen that the shape of the pattern on the screen 7 is dependent on the phase relations of the voltages applied to plates 6 by circuits P and S. Changes in amplitude off, or on, resonance only varies the size of the pattern. Further, a change of impressed frequency off resonance with circuits P and S will result in an appreciable change in the form of the pattern 8. These relations are readily understood when it is realized that a 90° phase difference exists between the potentials of circuits P and S when energy of the resonant frequency is applied, and that this phase angle varies as the applied frequency varies. The oscilloscope 5, then, demonstrates in a visual manner the effect of the applied frequency on the phase relation between the potentials across P and S, and proves that for applied frequencies other than the resonant frequency of circuits P–S the voltages across these two circuits are not in time quadrature.

While I have indicated and described one system for carrying my invention into effect, it will be apparent to one skilled in the art that my invention is by no means limited to the particular organization shown and described, but that many modifications may be made without departing from the scope of my invention, as set forth in the appended claims.

What I claim is:

1. In combination a source of electric waves of a predetermined radio frequency, solely two resonant circuits coupled to each other and arranged in cascade, the first of said circuits being coupled to said wave source to receive waves therefrom, each of said resonant circuits being exactly tuned to the said predetermined frequency, the voltages across said coupled resonant circuits differing 90° in phase when the waves impressed thereon are of the said predetermined frequency, and frequency departure indicating means responsive to a phase angle change between said voltages when the applied waves depart from resonance with said coupled circuits, said means comprising a cathode ray tube provided with a fluorescent screen and two pair of deflection elements, and each pair of said deflection elements being directly, and without the interposition of other electrical elements connected to a respective one of said coupled circuits.

2. In combination with a source of radio frequency waves including means for varying the frequency thereof; a wave transmission network consisting solely of two coupled circuits each exactly tuned to a common desired frequency, means coupling said source to said network, a resonance indicator device of the cathode ray tube type including a fluorescent screen and two pair of deflection electrodes, one pair of electrodes being directly connected to one of said coupled circuits, and the other pair directly to the second circuit; said direct connections being free of any other electrical elements, said screen having a pattern formed thereon whose shape is dependent on the relation between the said desired frequency and that of waves applied to the network.

STUART W. SEELEY.